(12) United States Patent
Barroche-Heinrich et al.

(10) Patent No.: US 7,134,865 B2
(45) Date of Patent: Nov. 14, 2006

(54) DEVICE FOR FORMING A DOUGH STRAND

(75) Inventors: Wilfried Barroche-Heinrich, Mitterdorf/Raab (AT); Peter Lambauer, Feldkirchen (AT)

(73) Assignee: Koenig Maschinen Gesellschaft m.b.H., Graz (AT)

( * ) Notice: Subject to any disclaimer, the term of this patent is extended or adjusted under 35 U.S.C. 154(b) by 648 days.

(21) Appl. No.: 10/362,303

(22) PCT Filed: Apr. 4, 2002

(86) PCT No.: PCT/AT02/00104

§ 371 (c)(1),
(2), (4) Date: Feb. 21, 2003

(87) PCT Pub. No.: WO02/080683

PCT Pub. Date: Oct. 17, 2002

(65) Prior Publication Data

US 2003/0175393 A1    Sep. 18, 2003

(30) Foreign Application Priority Data

Apr. 4, 2001  (AT)  ............................... A 543/2001

(51) Int. Cl.
*A21C 3/00* (2006.01)
(52) U.S. Cl. ............ 425/238; 425/227; 425/231; 425/232; 425/241; 425/371; 426/503
(58) Field of Classification Search ........ 425/238, 425/225, 227, 231, 232, 241, 371; 426/503
See application file for complete search history.

(56) References Cited

U.S. PATENT DOCUMENTS 5,266,341 A * 11/1993 Morikawa et al. .......... 426/231
5,427,515 A    6/1995 Muller et al.

(Continued)

FOREIGN PATENT DOCUMENTS

AT          283.235 B       7/1970

(Continued)

*Primary Examiner*—Joseph S. Del Sole
*Assistant Examiner*—Maria Veronica Ewald
(74) *Attorney, Agent, or Firm*—Townsend and Townsend and Crew LLP

(57) ABSTRACT

Apparatus for forming a dough strand from a preferably large-volume dough mixture (28) has a receptacle (2) for holding this dough mixture, which is provided at the bottom with a discharge opening (4) for the dough. Connected to this discharge opening are two shafts (6) arranged so as to be parallel to one another and driven in opposite directions in order to effect a downward movement of the dough. The shafts (6) are provided with profiles acting on the dough which are formed by star arms (5). The shafts (6) are arranged so as to be fixed and are driven in a timed manner for the rotary movement. The star arms (5), of which there is an even number for each shaft (6), in the position directed towards one another block the downward flow of dough therethrough over the major part of the axial length of the shaft (6). The star arms (5) of each shaft (6) are, however, provided at the shaft ends alternately with cutouts (10) for the flow of the dough therethrough during the pauses in the timed rotary movement of the shafts (6). Underneath the shafts (6) are arranged two depositing belts (12) in the longitudinal direction of the shafts and spaced apart from one another, which belts are drivable for circulatory movement in opposite directions and for preferably joint reciprocal displacement in the longitudinal direction thereof.

13 Claims, 4 Drawing Sheets

U.S. PATENT DOCUMENTS

| | | | |
|---|---|---|---|
| 5,733,583 A | 3/1998 | Muller | |
| 5,888,573 A * | 3/1999 | Hayashi | 426/502 |
| 5,919,495 A | 7/1999 | Fletcher et al. | |

FOREIGN PATENT DOCUMENTS

| | | | |
|---|---|---|---|
| DE | 2701444 A | 7/1977 | |
| DE | 3812615 A1 | 11/1987 | |
| EP | 0570113 A | 11/1993 | |
| EP | 0572210 A | 12/1993 | |
| FR | 2306432 A | 10/1976 | |

* cited by examiner

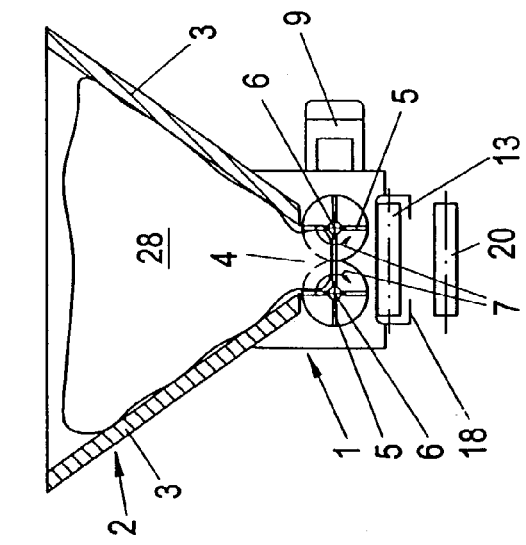
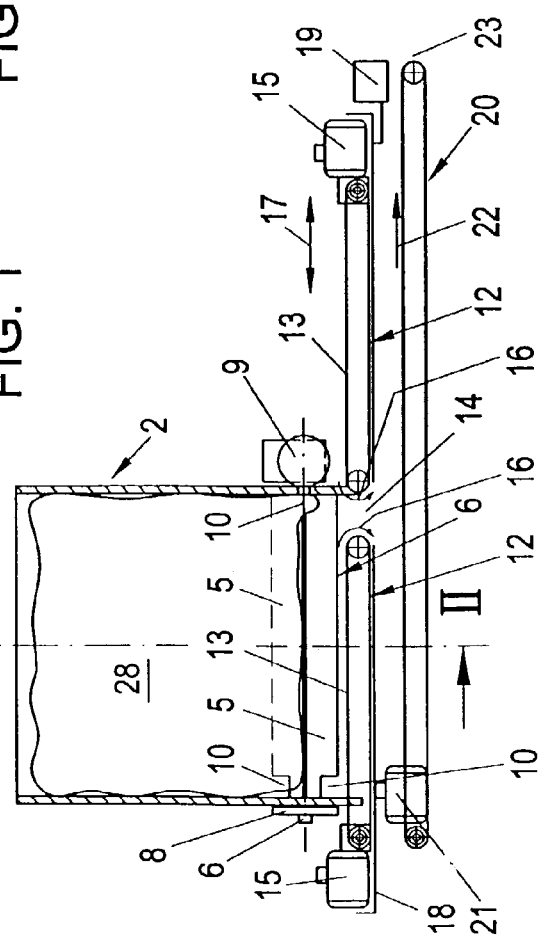
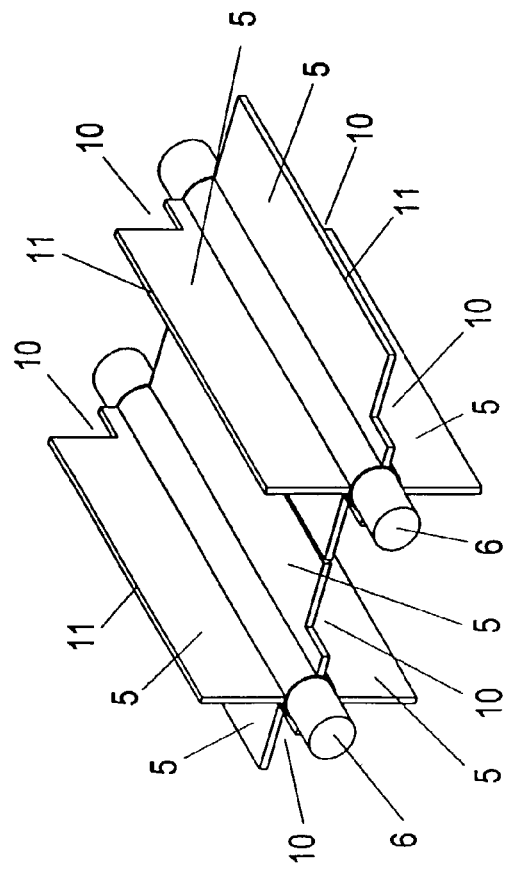

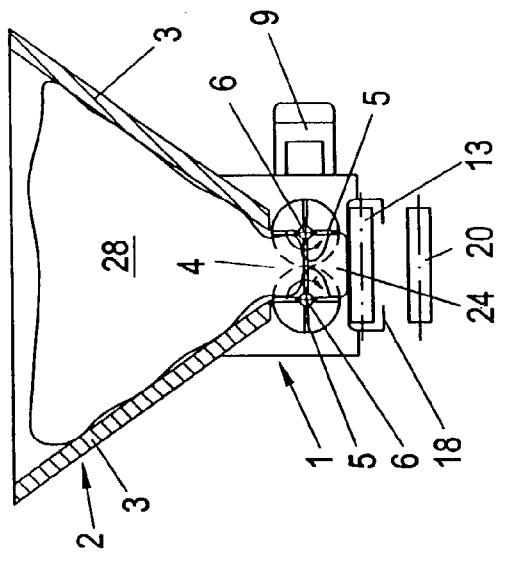
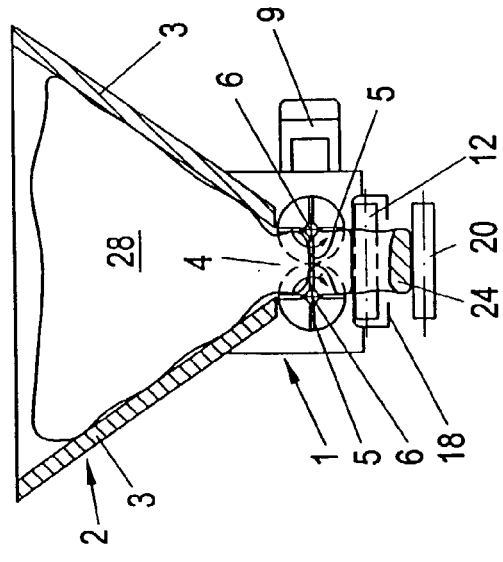
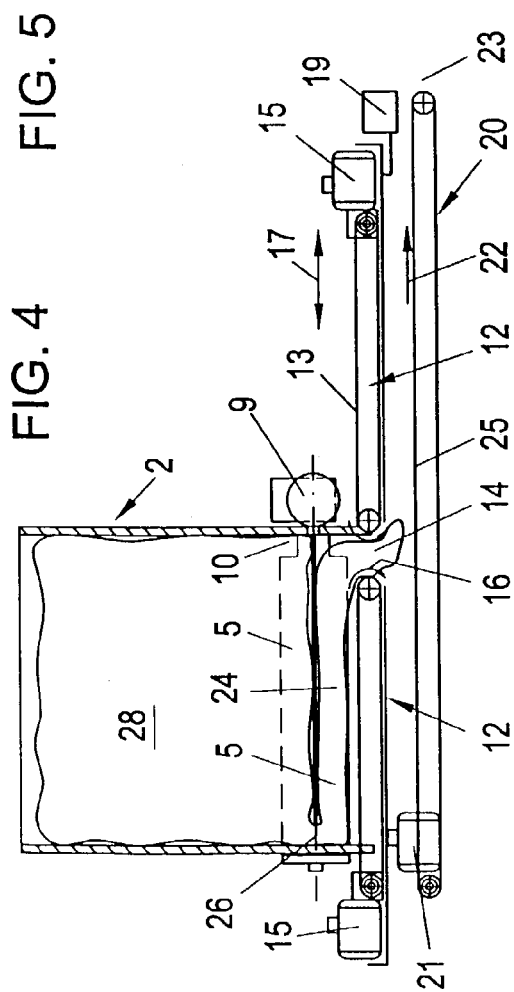
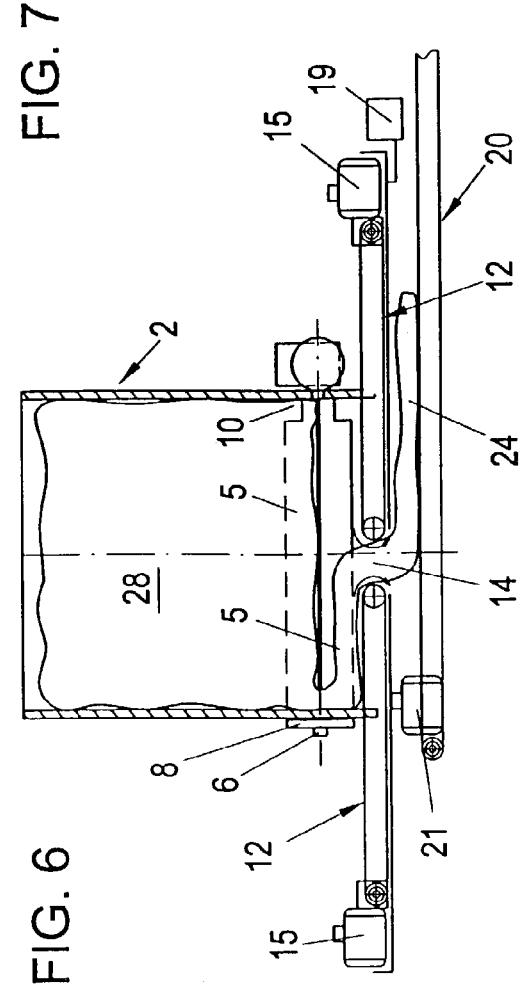

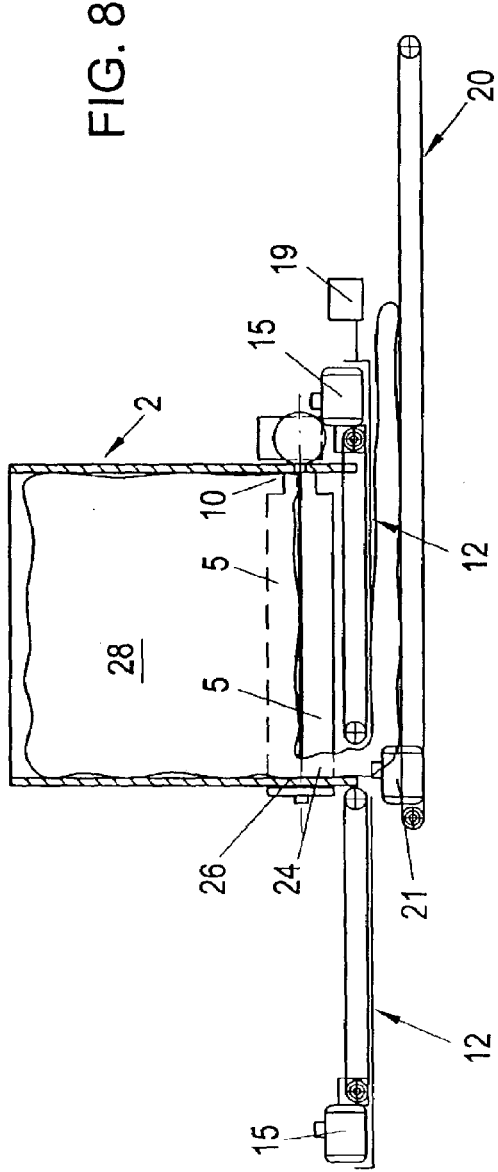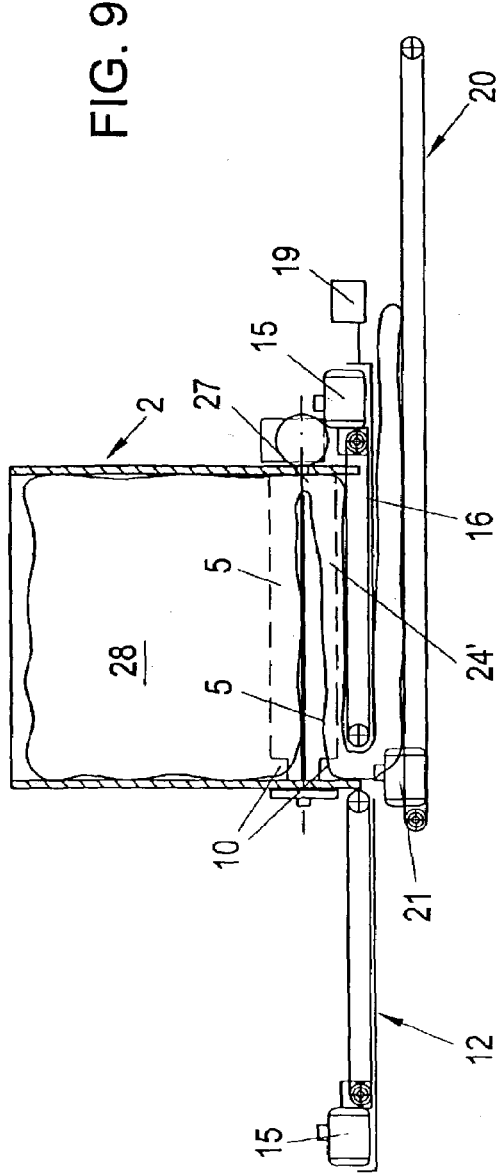

DEVICE FOR FORMING A DOUGH STRAND

BACKGROUND OF THE INVENTION

The invention relates to an apparatus for forming a dough strand from a preferably large-volume dough mixture, comprising a receptacle for holding the dough mixture, which is provided at the bottom with a discharge opening for the dough, to which two shafts are connected, arranged so as to be fixed parallel to one another and driven in opposite directions in a timed manner in order to effect a downward movement of the dough, the shafts being provided with profiles acting on the dough in the form of an even number of star arms for each shaft.

An apparatus of this kind is known from AT 283235 B.

In bakeries it is often necessary to form a dough strand from a dough mixture. This dough mixture mostly has a large volume, dependent on the size of the kneader with which the dough mixture has been processed. Usual large volumes are about 80 to 240 kg. In order to form dough strands of this kind, separating strips from the dough mixture by means of reciprocating cutters is known, the strips being lined up one after another overlapping and thereby forming a continuous ribbon of dough. However, this ribbon of dough does not have a uniform thickness at the overlap points, so that subsequent processing is required, causing further undesirable demands to be made on the dough.

Extruding the dough through a nozzle is also known, the nozzle cross-section determining the cross-section of the strand of dough to be produced. This procedure also has the disadvantage of considerable demands being made on the dough.

Finally, forming a continuous ribbon of dough from a large volume of dough by means of moving profiled roller pairs is known (EP 744 126 B). Here too, however, considerable undesirable demands made on the dough result.

SUMMARY OF THE INVENTION

An object of the present invention is to avoid considerable demands of this kind being made on the dough and to produce a dough strand with at least approximately uniform thickness. Taking as starting point the known design mentioned in the introduction, the invention achieves this object in that the star arms of the shafts in the position directed towards one another block the downward flow of dough therethrough only over the major part of the axial length of the shafts, the star arms of each shaft, however, being provided at the shaft ends alternately with cutouts for the flow of the dough therethrough during pauses in the timed rotary movement of the shafts, and in that two depositing belts are arranged underneath these shafts in the longitudinal direction of the shafts and spaced apart from one another, which belts are drivable for circulatory movement in opposite directions and for preferably joint reciprocal displacement in the longitudinal direction thereof. In an apparatus of this kind, the star arms of the two shafts in the position directed towards one another hold back the dough over the majority of the length of the shafts. Only where the star arms are provided with cutouts is a gap formed through which the dough is able to flow, so that the connection to the volume of dough located in the receptacle is always maintained. If a step of the timed rotary movement of the two shafts now occurs, a dough strand of the dough mixture located in the receptacle is separated by the following star arms and deposited downwardly onto the depositing belt located directly underneath the two shafts. This dough strand remains connected to the dough mixture in the receptacle since dough continues to flow through the newly opened gap formed by the cutouts of the star arms, only positioned at the other star shaft end, however, and this is implemented in such a way that it joins up with the deposited dough strand. The dough strand deposited in the next rotating step-by-step action of the shafts joins up with the previously deposited dough strand length, and so on. The individual dough strand portions joined up together arrive on the depositing belts. By means of the reciprocal movement of the belts adapted to the timed rotary movement of the shafts, the as-it-were meander-shape discharged form of the dough strand delivered by the star shaft pair is transformed into a continuous, linearly extending form of the dough strand, which may be supplied for further processing. According to a preferred embodiment of the invention, this is implemented by means of a delivery belt arranged underneath the two depositing belts and driven continuously for circulatory movement.

By appropriately matching the size of the cutouts to the shaft rotation, a largely uniform thickness of the dough strand produced may easily be achieved.

For constructional reasons it is expedient to arrange the two depositing belts on the same level in such a way that they are spaced apart at their ends directed towards one another. This spacing forms a location for the dough strand to pass through between the two depositing belts to the delivery belt. This spacing is preferably at least the size of the thickness of the dough strand to be produced in order to avoid compression of the dough strand between the two depositing belts. Furthermore, according to a preferred embodiment of the invention, the arrangement is such that each depositing belt is at least as long as the mutual spacing apart (measured in the axial direction of the shafts) of the cutouts arranged at the two ends. As a result the dough strand portions supplied via the cutouts of the star arms to the depositing belts easily join up with the dough strand portion deposited on the depositing belt in the course of the rotary movement of the shafts.

The even number of star arms of each shaft is four, according to a preferred embodiment of the invention, which has the advantage that in the position of a star arm pair directed towards one another and generally horizontal, in which position the pair blocks the flow of dough therethrough over the star arm length, the following star arms extend vertically upwards and as a result do not obstruct the follow-on flow of the dough to the opening formed by the particular cutout.

The cutouts of the star arms, according to a preferred embodiment of the invention, start from the edges of the star arms remote from the shaft axis. This is constructionally simpler than gaps in the star arms close to the axis and moreover enables the cutouts of each of two star arms cooperating with one another to block the flow of dough therethrough in the central region of the discharge opening of the receptacle to be arranged so that these two cutouts in each case form a common opening whose size equals the sum of the two cutouts. Each cutout is preferably rectangular, and the individual cutouts are each the same size to keep the timing times the same.

The two star arm shafts are expediently driven by a common motor to ensure the most synchronous movement possible. However, according to the invention an individual motor may be provided for each depositing belt for the circulatory movement, which can run simultaneously with the depositing belt. The drive of the circulatory movement of the two depositing belts may therefore be adjusted or regulated mutually independently so that it is better able to adapt to the conditions prevailing at the time. The two depositing belts are expediently held in a common frame which is movable to and fro by means of a drive in the axial direction of the shafts. This ensures that the gap formed by the aforementioned spacing between the two depositing belts remains constant, but the arrangement may be made so that this gap width is adjustable.

Further characteristics and advantages of the invention are evident from the present description of an embodiment represented schematically in the drawing.

BRIEF DESCRIPTION OF THE DRAWINGS

FIG. 1 shows the apparatus in a vertical section;
FIG. 2 is a section along line II—II;
FIG. 3 shows in axonometric representation the two star shafts on a larger scale;
FIGS. 4 to 11 show the apparatus in various operational phases in sections as in FIGS. 1 and 2.

DESCRIPTION OF THE PREFERRED EMBODIMENTS

Figure 12:
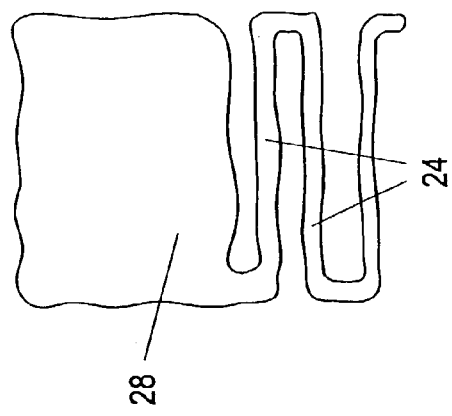
FIG. 12 shows schematically the depositing of the individual portions of the dough strand.

The apparatus has a support 1 which carries a receptacle 2 for holding the dough for processing. This receptacle 2 has a large volume, about 80 to 240 kg, so that it can hold the dough mixture 28 previously processed by a kneader in its entirety. The receptacle 2 has side walls 3 arranged at an angle (FIG. 2), resulting in a funnel shape whose discharge opening 4 is at the bottom. Connected to this discharge opening 4 are two shafts 6 provided with star arms 5 and mounted in the support 1 so that, in the position of the two shafts 6 represented in FIG. 2, the dough outflow from the discharge opening 4 is closed off by means of two star arms 5, directed towards one another, over a major part of the axial length of the two shafts 6. The two shafts 6 are driven together for circulatory movement in opposite directions (arrows 7) in such a way that, as the two shafts 6 rotate, conveying of the dough downwardly out of the discharge opening 4 results. The two shafts 6 are coupled by means of gears 8 (FIG. 1) wedged thereon so that they may be driven by a single motor 9 for rotary movement, and this may take place in a timed or intermittent manner, i.e. with stationary phases existing between the individual movement steps, in which the two shafts 6 adopt the position represented in FIG. 2 in which the discharge of the dough out of the discharge opening 4 is interrupted over the major part of the axial length of the shafts 6.

As FIG. 3 shows, each shaft 6 is provided with four star arms 5 mutually staggered by equal angles, i.e. 90°. Each star arm 5 does not extend over the whole axial length of the shaft 6, however, but has on one end face of the star arm a cutout 10 which starts from the edge 11 of the respective star arm 5 that lies parallel to the axis of the shaft 6. Each cutout 10 is rectangular, and the individual cutouts 10 are arranged on the star arms 5 of the relevant shaft 6 alternately so that a cutout 10 on the right-hand end face of the shaft 6 (with respect to the representation in FIG. 1) follows a cutout 10 on the left-hand end face of the same shaft 6 when the shaft 6 is rotated in the arrow direction 7 (FIG. 2). Further, the cutouts 10 are arranged on the two shafts 6 so that two cutouts 10 in each case lie opposite one another when the star arms 5 reach the position according to FIG. 2. The two cutouts 10 of the two shafts 6 then form a common opening through which the dough is able to flow downwardly out of the receptacle 2.

The dough exiting downwardly out of the receptacle 2 through the discharge opening 4 thereof arrives on the upper run 13 of one of two depositing belts 12 arranged on the same level and arranged so as to be spaced apart horizontally from one another, thereby leaving a space between the two ends of the two depositing belts 12 directed towards one another which forms a gap 14 that is at least as large as the thickness of the dough strand to be produced.

The two depositing belts 12 are driven by means of respective motors 15, and this is implemented in mutually opposite circulatory directions (arrows 16). The two depositing belts 12 are displaceable to and fro in the direction of the double arrow 17 (FIG. 1), far enough for the gap 14 to arrive alternately underneath one of the two openings formed by the cutouts 10. To this end, the two depositing belts 12 are held in a common frame 18 which is only schematically represented in FIG. 1 and is movable to and fro in the double arrow direction 17 by means of a drive 19, e.g. a pneumatically or hydraulically operated double-acting cylinder. This frame 18 is of course designed so that it does not obstruct the passage of the dough strand through the gap 14. The two depositing belts 12 may be so arranged in the frame 18 that the width of the gap 14 can be varied to enable it to match different thicknesses of the dough strand to be produced. Optionally, however, the two depositing belts 12 may also be displaceable horizontally independently of one another, but provided that the receiving, mentioned later on, of the dough strand flowing downwardly in a meander shape from the star arms 5 or the cutouts 10 thereof on the depositing belts 12 remains ensured.

The two depositing belts 12 together form a continuous dough strand which may be supplied for further processing. Expediently, this does not take place directly, instead the two depositing belts 12 deposit the dough strand portions received by them onto a delivery belt 20 arranged underneath the two depositing belts 12 formed by continuous belts, the delivery belt also being formed by a continuous belt. The delivery belt 20 is driven by means of a motor 21 for continuous circulatory movement in the direction of the arrow 22 and supplies the produced dough strand to further processing at location 23.

Figure 10:
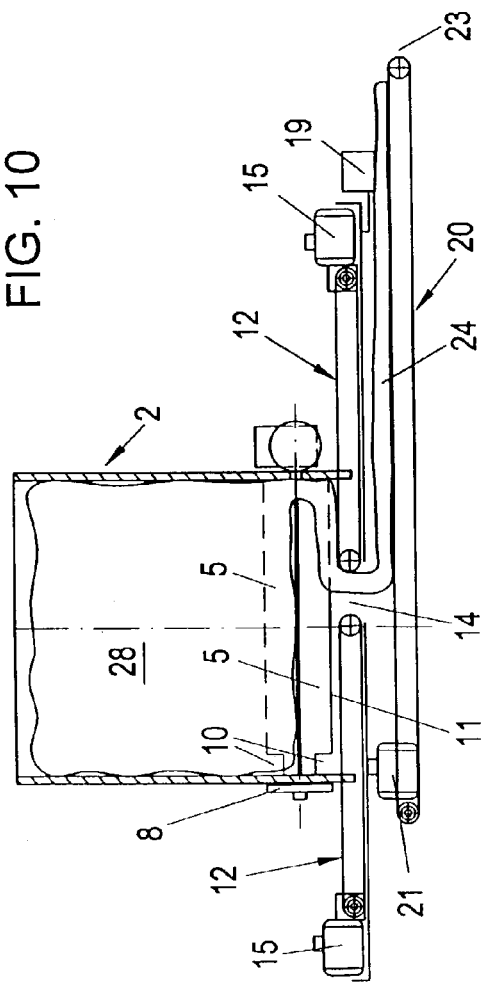
Figure 11:
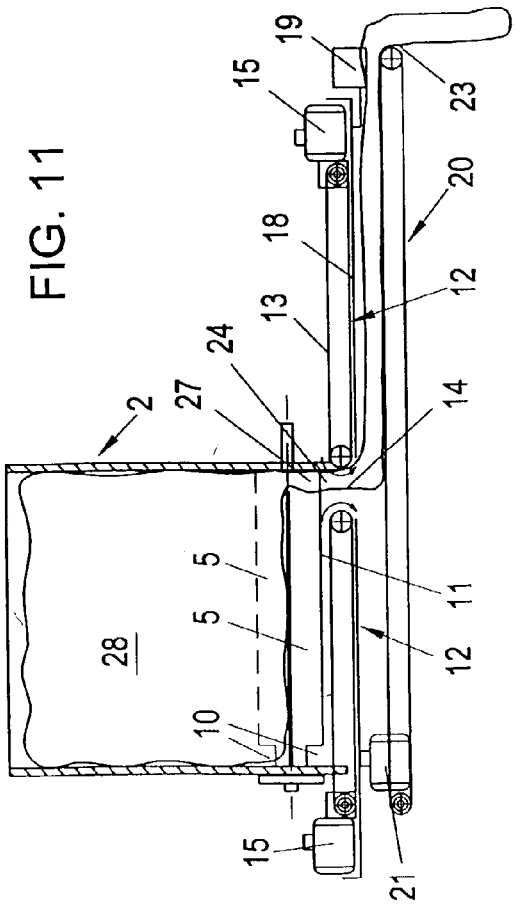

The apparatus operates as follows:

A position of the star arms 5 of the shafts 6 and the two depositing belts 12 according to FIGS. 4 and 5 is assumed. In this position the dough mixture 28 in the receptacle 2 is only able to flow out through the opening 26 located on the left in FIG. 4, which is formed by the two mutually facing cutouts 10 of the two star arms 5 of the shafts, which star arms 5 otherwise block the downward passage of the dough. A dough strand portion 24 is thereby produced, which arrives on the left-hand depositing belt 12 arranged underneath the two shafts 6. As a result of the circulatory movement (arrow 16) of the belt, the dough strand 24 deposited on the depositing belt 12 is continuously supplied to the gap 14 and through this gap 14 is deposited on the upper run 25 of the delivery belt 20. At the same time the frame 18 containing the two depositing belts 12 is displaced by means of its drive 19 to the left (FIG. 4) so that the gap 14 gradually arrives in the position according to FIG. 6. It is apparent that the delivery belt 20 has then already received part of the dough strand 24. While the two shafts 6 with their star arms 5 are stationary, the frame 18 with the two depositing belts 12 moves further to the left (FIG. 6) and finally reaches the left-hand end position according to FIG. 8. As soon as this position is reached, the two shafts 6 are further rotated 90° in the arrow direction 7 (FIG. 2). This timed step-by-step action takes place so quickly that a dough strand piece 24' over the length of the star arms 5 is deposited during this star arm rotation onto a depositing belt 12, but now onto the right-hand depositing belt 12 (FIG. 9). At the same time the aforementioned further 90° rotation of the shafts 6 causes the cutouts 10, which previously (FIGS. 4, 6) formed an opening 26 located at the left-hand end of the shafts 6 for the downward passage of the dough, now to arrive in the vertical position (FIG. 1) so that this opening 26 is closed and instead a similar opening 27 (FIG. 9) located at the right-hand end of the shafts 6 is opened. The two depositing belts 12 now move to the right (FIG. 10), the right-hand depositing belt 12, as a result of its circulatory movement (arrow 7, FIG. 2), depositing the dough strand continuously flowing through the opening 27 to the depositing belt onto the delivery belt 20. As soon as the position according to FIG. 11 is reached, in which the gap 14 formed by the two depositing belts 12 has reached its right-hand end position in which it lies underneath the opening 27, the position according to FIG. 1 is reached. By means of their timed step-by-step action, the two shafts 6 are now again further rotated 90°, whereupon a new dough strand portion is deposited on the left-hand depositing belt 12 in the same way as was described with reference to FIG. 9. The two depositing belts 12 are then displaced to the left (FIG. 11) together, so that the dough strand 24 emerging through the opening 27 is gradually deposited on the right-hand depositing belt 12 which continuously deposits it on the delivery belt 20 located underneath. As soon as the position according to FIG. 8 is reached, a cycle is completed and a new operating cycle starts.

As is evident, the width of the gap 14 between the two depositing belts 12 is at least the same size, preferably larger than the thickness of the dough strand to be produced. This thickness may be varied by changing the size of the cutouts 10. This may be effected by replacing the shafts 6 with shafts 6 having correspondingly larger or smaller cutouts 10 or, optionally, also by means of adjustable slides arranged on the shafts 6 and fixable in the adjusted position. Similarly, the thickness of the dough strand may be varied by increasing or reducing the period of time that passes until the respective following star arms 5 are moved into the closed position. A dough strand having substantially constant thickness may be produced by mutual adaptation of these options.

Schematically represented in FIG. 12 is the aforementioned discharge of the dough strand 24 from the dough material 28 located in the receptacle 2. It is apparent that the previously described depositing of the dough strand 24 initially takes place in a meander shape, but as a consequence of the operation of the two depositing belts 12 the meander shape is transformed into an elongated shape of the dough strand 24.

The invention claimed is:

1. Apparatus for forming a continuous dough strand from a large-volume dough mixture, comprising a receptacle for holding the dough mixture, which is provided at the bottom with a discharge opening for the dough, to which two shafts are connected, arranged so as to be fixed parallel to one another and driven in opposite directions in a timed manner for rotary movement in order to effect a downward movement of the dough, the said shafts being provided with profiles acting on the dough in the form of an even number of star arms for each shaft, characterized in that the star arms of the shafts in the position directed towards one another block the downward flow of dough therethrough only over a major part of the axial length of the shafts, the star arms of each shaft being provided at the shaft ends alternately with cutouts for the flow of the dough therethrough during pauses in the timed rotary movement of the shafts, and in that two depositing belts are arranged underneath the shafts in the longitudinal direction of the shafts and spaced apart from one another, which belts are drivable for circulatory movement in opposite directions and for reciprocal displacement in the longitudinal direction thereof.

2. Apparatus according to claim 1, characterized in that a delivery belt driven continuously for circulatory movement is arranged underneath the two depositing belts.

3. Apparatus according to claim 1, characterized in that each depositing belt is at least as long as the mutual spacing of the cutouts arranged at the two shaft ends.

4. Apparatus according to claim 1, characterized in that the two depositing belts lie on the same level and are spaced apart at their ends directed towards one another to form a gap.

5. Apparatus according to claim 1, characterized in that the cutouts of each of two star arms cooperating with one another are arranged such that the two cutouts in each case form a common opening.

6. Apparatus according to claim 4, characterized in that the spacing formed by the gap is at least as large as the thickness of the dough strand to be produced.

7. Apparatus according to claim 1, characterized in that each shaft has four star arms.

8. Apparatus according to claim 1, characterized in that each cutout starts from the edge of the star arm remote from the axis of the shaft.

9. Apparatus according to claim 1, characterized in that the cutouts are rectangular and are each the same size.

10. Apparatus according to claim 1, characterized in that the two shafts are driven by a common motor.

11. Apparatus according to claim 1, characterized in that an individual motor for the circulatory movement is provided for each depositing belt.

12. Apparatus according to claim 1, characterized in that both depositing belts are held in a common frame which is movable to and fro by means of a drive in the axial direction of the shafts.

13. Apparatus according to claim 1 wherein the belts are drivable for joint reciprocal displacement in the longitudinal direction.

* * * * *